US009455660B2

(12) United States Patent
Merienne et al.

(10) Patent No.: US 9,455,660 B2
(45) Date of Patent: Sep. 27, 2016

(54) METHOD FOR CONTROLLING THE ELECTROMAGNETIC TORQUE OF A HIGH-SPEED-SYNCHRONOUS MACHINE

(71) Applicant: RENAULT s.a.s., Boulogne-billancourt (FR)

(72) Inventors: Ludovic Merienne, Gif sur Yvette (FR); Adbelmalek Maloum, Chevilly la Rue (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/404,515

(22) PCT Filed: May 16, 2013

(86) PCT No.: PCT/FR2013/051066
§ 371 (c)(1),
(2) Date: Nov. 28, 2014

(87) PCT Pub. No.: WO2013/178906
PCT Pub. Date: Dec. 5, 2013

(65) Prior Publication Data
US 2015/0194919 A1    Jul. 9, 2015

(30) Foreign Application Priority Data

May 29, 2012 (FR) ..................... 12 54908

(51) Int. Cl.
*H02P 21/00* (2016.01)
*H02P 21/14* (2016.01)

(52) U.S. Cl.
CPC ......... *H02P 21/141* (2013.01); *H02P 21/0089* (2013.01)

(58) Field of Classification Search
CPC ......... H02P 27/08; H02P 21/00; H02P 27/04
USPC ........... 318/400.01, 400.02, 400.07, 400.14, 318/400.15, 700, 721, 727, 430, 432, 779, 318/799, 800, 801; 388/800, 822, 823, 821; 363/40, 44, 95
See application file for complete search history.

(56) References Cited

U.S. PATENT DOCUMENTS

| | | | | |
|---|---|---|---|---|
| 5,656,911 A | * | 8/1997 | Nakayama | .......... H02P 21/0035 318/718 |
| 5,793,178 A | * | 8/1998 | Biais | ................... B60L 11/1807 318/700 |
| 6,876,169 B2 | * | 4/2005 | Gallegos-Lopez | ..... H02P 21/06 318/609 |
| 7,242,163 B2 | * | 7/2007 | Gallegos-Lopez | ..... H02P 21/06 318/722 |

OTHER PUBLICATIONS

International Search Report Issued Sep. 23, 2013 in PCT/FR13/051066 Filed May 16, 2013.
French Search Report Issued Jan. 11, 2013 in French Patent Application No. 1254908 Filed May 29, 2012.

* cited by examiner

*Primary Examiner* — Antony M Paul
(74) *Attorney, Agent, or Firm* — Oblon, McClelland, Maier & Neustadt, L.L.P.

(57) ABSTRACT

A method for controlling electromagnetic torque of a three-phase synchronous machine with permanent magnets, including measuring current delivered to the three phases of the machine, transposing the three measured currents into a direct current component and a quadratic current component using Park's transformation, and receiving an instruction for the quadratic current component. When the direct current component is negative, a defluxing control mode is activated in which the machine is controlled from a direct voltage component and a quadratic voltage component of the machine, the direct voltage component and the quadratic voltage component being determined in Park's plane.

9 Claims, 2 Drawing Sheets

METHOD FOR CONTROLLING THE ELECTROMAGNETIC TORQUE OF A HIGH-SPEED-SYNCHRONOUS MACHINE

The invention relates to a method for controlling the electromagnetic torque of a three-phase synchronous motor with permanent magnets, and relates more particularly to torque control when the voltages saturate.

In an electrically powered motor vehicle, the torque provided by an electric motor must be controlled. Since the torque of an electrical machine is directly related to the currents flowing in the machine, these currents must be controlled in a precise way.

In a synchronous machine, notably a three-phase synchronous machine with permanent magnets and axial flux, the currents in the three stator phases are sinusoidal and each is offset by ^-rad. These currents create a rotating magnetic field in the electrical machine. The rotor is composed of permanent magnets, having between 1 and 5 pairs of poles, for example. Like a compass, the rotor naturally aligns itself with the rotating magnetic field created by the rotor. Thus, the frequency of rotation of the rotor is equal to (synchronous with) the frequency of the stator currents. The amplitude of the stator currents and the power of the rotor magnets are responsible for creating the torque needed to rotate the machine. Sinusoidal voltages, each offset equally by $$\frac{2\pi}{3} \text{rad},$$

must therefore be applied to each phase of the stator in order to control these currents.

Generally, it is simpler to apply regulation to constant values rather than to sinusoidal signals. The Park transform is generally used to project a three-phase system onto a two-dimensional space for the purpose of location in an equivalent rotating reference frame. In this way, the three sinusoidal currents and three sinusoidal voltages of the stator relating to the three phases of a three-phase system can be transposed into a space in which the three sinusoidal current or voltage signals are expressed in the form of two constant current or voltage signals (one component on the direct axis $X_d$ and one component on the quadrature axis $X_q$). For this purpose, the Park transform is based on a reference frame linked to the rotating field; in the case of the synchronous machine, it is based on a reference frame linked to the rotor.

By working with currents and voltages expressed in the Park space, it is thus possible to act on constant currents or voltages rather than sinusoidal signals in order to regulate the three-phase machine to be controlled.

By performing the inverse transform, it is possible to return to the normal reference frame of the machine and thus to know exactly which voltages or which currents are to be applied to each phase of the machine.

Using a battery as the power supply of the three-phase electrical machine imposes additional constraints, in that the voltages that can be applied are limited by the battery capacity. Indeed, these limitations make it impossible to achieve some setpoints. A setpoint outside the attainable space commonly creates instability.

The aim is to ensure the stability of the currents in the machine while it is being controlled, in spite of the voltage limitations. If, owing to these constraints, the setpoints are unattainable, then the aim is to approach the setpoint as closely as possible.

The document U.S. Pat. No. 3,851,234 describes a method for preventing magnetic saturation by reducing the speed of the motor providing the torque.

The document U.S. Pat. No. 5,015,937 describes a method for controlling a wound-rotor synchronous machine in open loop mode with data tables in order to prevent saturation.

The document U.S. Pat. No. 6,181,091 describes a method for controlling a synchronous machine with permanent magnets in which saturation is prevented by modifying the operation of the phase width modulation module supplying the voltages in each branch of the motor.

In these known control methods, the electromagnetic torque available to the synchronous machine is reduced to prevent voltage saturation, notably by directly controlling a current component in the Park space.

In fact, a map of the corresponding direct current component is usually calculated in order to retain control of the quadrature current component, so that the setpoint for the quadrature component can be achieved. This method has the disadvantage that a process of adjustment of the current maps must be carried out. Furthermore, there is no way of ensuring that optimal currents will be obtained for a given electromagnetic torque. This is because, with this mapping method, in order to ensure that voltage saturation conditions do not develop, a safety margin is provided on the value of the direct current component; that is to say, the direct current component is reduced more than necessary, to avoid the risk of saturation in the control of the system to the detriment of the efficiency of the machine.

This reduction of the direct current component implies a reduction of the voltages and therefore a decrease in the available electromagnetic torque.

The invention proposes to provide a method for controlling the electromagnetic torque of a synchronous machine with permanent magnets which enables current stability to be provided in the synchronous machine when the latter is operating at high speed with saturated voltages. According to one aspect of the invention, one embodiment proposes a method for controlling the electromagnetic torque of a three-phase synchronous machine with permanent magnets, which comprises measuring the current delivered to the three phases of the machine, transposing the three measured currents into a direct current component and a quadrature current component on the basis of a transform of the three-phase systems, and receiving a setpoint for the quadrature current component.

According to one characteristic of the invention, when the direct current component is negative, a defluxing control mode is activated, in which the machine is controlled on the basis of a direct voltage component and a quadrature voltage component of said machine, the direct voltage component and the quadrature voltage component being determined in the plane related to the transform of the three-phase systems.

The transform of the three-phase systems may be a Park transform. It may also be a Fortescue transform, a Clarke transform, or a Ku transform.

In the Park space, the system to be controlled comprises a direct voltage component and a quadrature voltage component applied on the two axes of the Park plane (the direct axis and the quadrature axis) of the synchronous machine, the two voltage components being expressed as a function of the direct current component and the quadrature current component of the synchronous machine, the two current components being applied on the two axes of the Park plane. When the rotor of the synchronous machine operates at high speed, the direct current component has a negative value and causes losses if it is not compensated.

The defluxing control mode makes it possible to compensate the term due to the magnetic flux of the permanent magnets, which is proportional to the rotation speed of the rotor, the flux of the magnets being constant, and which therefore becomes non-negligible at high speed. The term due to the magnetic flux, also called the electromagnetic force of the machine, introduces perturbations that must be compensated. The voltage control of the synchronous machine at high speed thus enables the perturbation due to the magnetic flux to be compensated to a maximum at all times.

Advantageously, the defluxing control mode is exited when the direct current component returns to a positive or zero value.

The synchronous machine advantageously has perfect symmetry between the direct axis and the quadrature axis of the plane of the transform of the three-phase systems, enabling equality to be obtained between the equivalent inductances on each axis of the plane of the transform of the three-phase systems.

Preferably, the direct component and the quadrature component of the control voltage of the synchronous machine depend on the same control parameter, determined so as to maintain a value of the direct current component near to zero and enabling the term due to the magnetic flux of the permanent magnets to be compensated.

When the direct current component has a negative value, this component represents losses for the machine. The lowest possible value of this direct current component must therefore be maintained in order to minimize the losses, while keeping said value of this direct current component at a sufficient level to compensate the electromagnetic force corresponding to the term due to the magnetic flux generated by the permanent magnets of the rotor.

The direct component and the quadrature component of the control voltage are preferably proportional to the same maximum amplitude, and depend in a sinusoidal manner on the control parameter ($\Theta$), the control parameter ($\Theta$) varying, for example, within a range $[-\frac{\pi}{2}; \frac{\pi}{2}]$.

More generally, the control parameter ($\Theta$) varies within an amplitude range which is less than or equal to Pi.

According to another aspect, a system for controlling the electromagnetic torque of a three-phase synchronous machine with permanent magnets is proposed in one embodiment, comprising means for measuring the current delivered to the three phases of the machine, means for transposing the three measured currents into a direct current component and a quadrature current component on the basis of the Park transform, and means for receiving a setpoint for the quadrature current component, characterized in that it comprises control means adapted to activate, when the direct current component is negative, a defluxing control mode in which the machine is controlled on the basis of a direct voltage component and a quadrature voltage component of said machine, the direct voltage component and the quadrature voltage component being determined in the Park plane.

Advantageously, the control means may comprise an activation module adapted to activate the defluxing control mode when the direct current component is negative, and to disable the defluxing control mode when the direct current component is positive.

Preferably, the control means comprise a proportional-integral controller adapted to determine the same control parameter related to the direct voltage component and the quadrature voltage component on the basis of the difference between the setpoint for the quadrature current component and the value of the quadrature current component, and a module adapted to determine the direct and quadrature voltage components on the basis of the control parameter.

The control system may also comprise transposition means adapted to apply a Park transform to the measured currents in order to obtain the direct current component and the quadrature current component.

Other characteristics and advantages of the invention will be apparent from an examination of the detailed description of one embodiment, which is not limiting in any way, and the appended drawings, in which:

FIG. 1 shows a flow diagram, according to one embodiment of the invention, of a method for controlling the electromagnetic torque of a synchronous machine when the voltages at its terminals saturate.

Figure 1:
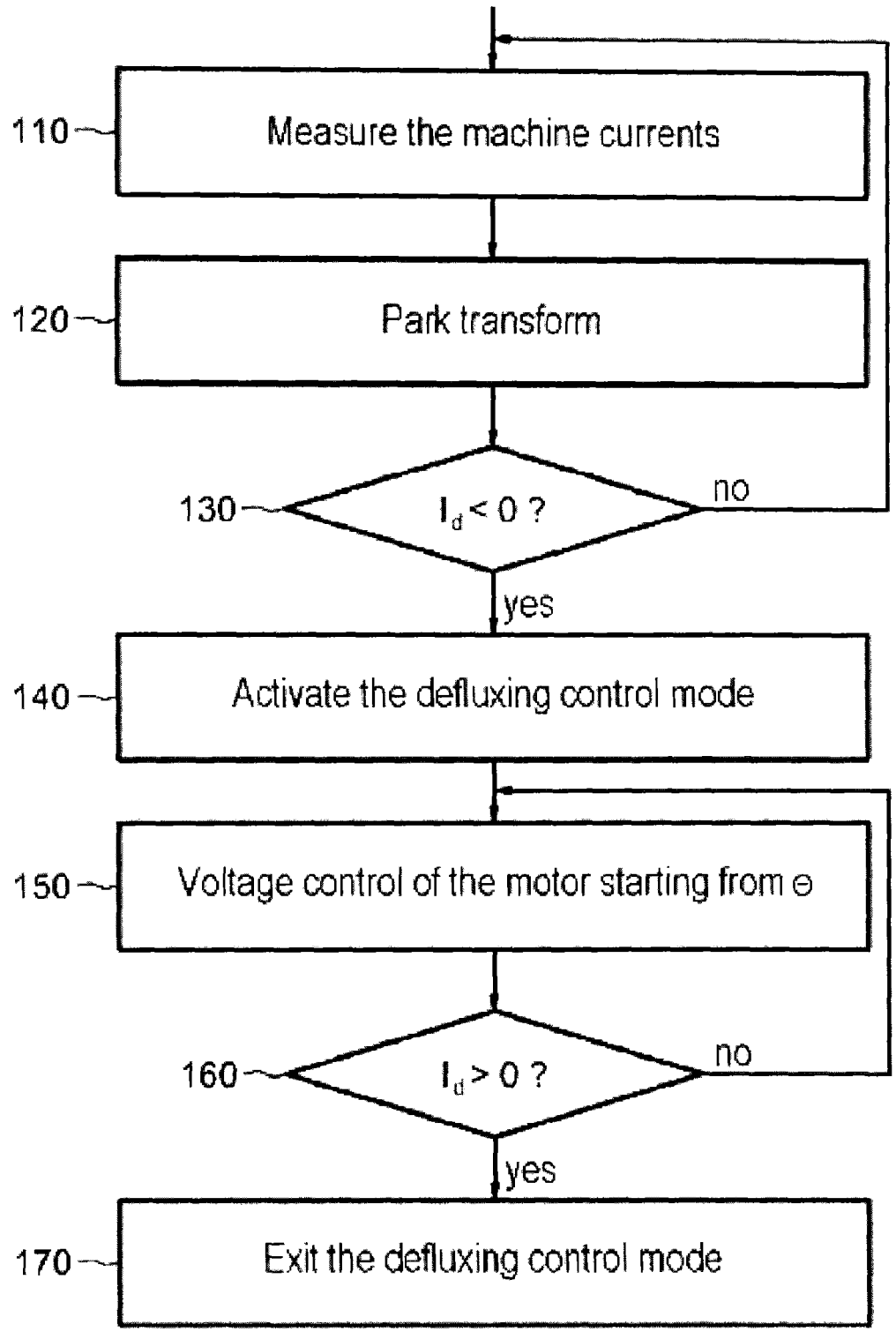
FIG. 1 shows a flow diagram of a method for controlling the electromagnetic torque of a synchronous machine according to one embodiment.

In a first step 110, the current is measured for each of the three phases of the three-phase synchronous machine with permanent magnets.

In a second step 120, the Park transform is applied to the three measured currents so as to obtain a direct current component $L_d$ and a quadrature current component $I_q$.

In the Park space, the system of equations to be controlled for the synchronous machine is as follows:

$$\begin{cases} V_d = R_s I_d + L_d \dot{I}_d - \omega_r L_q I_q \\ V_q = R_s I_q + L_q \dot{I}_q - \omega_r (L_d I_d + \phi_f) \end{cases} \quad (1)$$

where $V_d$ and $V_q$ are the voltages applied to the two axes, namely the direct and quadrature axes respectively, of the Park plane of the machine, $I_d$ and $I_q$ are the currents flowing in the machine on the two axes, namely the direct and quadrature axes respectively, of the Park plane, $R_s$ is the equivalent resistance of the stator of the machine, $L_d$ and $L_q$ are the inductances on each of the direct and quadrature axes, respectively, of the Park plane of the machine, $\omega_r$ is the rotation speed of the magnetic field of the machine (that is to say, the rotation speed of the rotor multiplied by the number of pairs of poles of the machine), and $\phi_f$ is the flux generated by the rotor magnets.

The voltages $V_d$ and $V_q$ are created by a battery-powered inverter. The constraints to be met are therefore:

$$\sqrt{V_d^2 + V_q^2} \le \frac{V_{bat}}{\sqrt{3}} \quad (2)$$

where $V_{bat}$ is the voltage of the battery supplying the inverter and the chopper.

The aim is to generate an electromagnetic torque with the best possible efficiency for the synchronous machine over a known speed range, and more precisely at high speed. When the motor rotates at high speed, the control voltages of the machine are saturated, and the direct current component $I_d$ in the Park plane is negative.

A check is therefore made in step 130 to determine whether the direct current component has a negative value. If the direct current component $I_d$ in the Park space has a negative value, a defluxing control mode is activated in step 140.

The electromagnetic torque generated by the synchronous machine can be calculated on the basis of the following expression:

$$C_{em} = p(\phi_d I_q - \phi_q I_d) \qquad (3)$$

where $C_{em}$ is the electromagnetic torque generated by the machine, p is the number of pairs of poles of the machine rotor, and $\phi_d$ and $\phi_q$ are the flux components generated on the direct and quadrature axes, respectively, of the machine, which are expressed in the form:

$$\phi_d = L_d I_d + \phi_f \text{ and } \phi_q = L_q I_q \qquad (4)$$

In the present case, the synchronous machine has a perfect symmetry between the direct axis and the quadrature axis of the Park space. This gives the remarkable property La=$L_q$, so that we can write $$C_{em} = p \phi_f I_q \qquad (5)$$

Thus, in a machine of this type, in order to control the torque while minimizing the Joule losses generated by the direct current component $I_d$, provision must be made to have a direct current component $I_d$ as close as possible to zero, because it is only the quadrature component $I_q$ that contributes to the electromagnetic torque.

The invention is also applicable in the case where La=$L_q$ if $L_d$ is greater than $L_q$, but in this case the setpoint of the quadrature component $I_q$ must be corrected as a function of the direct current component la that is present, in order to provide a constant torque. This is because in this case, where the direct current component La is negative, it gives rise to a decrease in the torque generated by the machine. It is thus possible to minimize the loss of torque by bringing the direct current component la as near as possible to zero.

At high speed, the direct current component La cannot be canceled completely, since the term $\omega_r \phi_f$, called the electromagnetic force, due to the magnetic flux of the permanent magnets becomes too great and must be compensated. Optimal operation requires the use of all the available voltage, as follows:

$$\sqrt{v_d^2 + v_q^2} = \frac{V_{bat}}{\sqrt{3}} \qquad (6)$$

$V_d$ and $V_q$ can be expressed by using a control variable $\Theta$ which is calculated by the following transformation:

$$\begin{cases} V_d = -\frac{V_{bat}}{\sqrt{3}} \sin(\theta) \\ V_q = \frac{V_{bat}}{\sqrt{3}} \cos(\theta) \end{cases} \qquad (7)$$

The currents in steady state conditions at high speed are then expressed in the form:

$$\begin{cases} I_d = \frac{1}{R_s^2 + \omega_r^2 L_d L_q}(R_s V_d + \omega_r L_q V_q - \omega_r^2 L_q \phi_f) \\ I_q = \frac{1}{R_s^2 + \omega_r^2 L_d L_q}(-\omega_r L_d V_d + R_s V_q - \omega_r R_s \phi_f) \end{cases} \qquad (8)$$

At high speed, $R_s \ll \omega_r L_d = \omega_r L_q$, allowing equation (8) to be expressed thus:

$$\begin{cases} I_d = \frac{\omega_r L_q V_q - \omega_r^2 L_q \phi_f}{R_s^2 + \omega_r^2 L_d L_q} \\ I_q = \frac{-\omega_r L_d V_d - \omega_r R_s \phi_f}{R_s^2 + \omega_r^2 L_d L_q} \end{cases} \qquad (9)$$

Since the flux of the magnets is constant, it plays no part for the purposes of control. It is therefore perceived as a perturbation. Thus, on the basis of equation (7), we find that, in steady high speed conditions:

$$\begin{cases} I_d = G_d \cos(\$) - \text{perturbation}_d \\ 1 I_q = G_q \sin(\wedge) - \text{perturbation}_q \end{cases} \qquad (10)$$

where $$G_d = \frac{\omega_r L_q V_{bat}}{\sqrt{3}(R_s^2 + \omega_r^2 L_d L_q)} \text{ and } \text{perturbation}_d = \frac{\omega_r^2 L_q \phi_f}{R_s^2 + \omega_r^2 L_d L_q},$$

and $$G_q = \frac{\omega_r L_d V_{bat}}{\sqrt{3}(R_s^2 + \omega_r^2 L_d L_q)} \text{ and } \text{perturbation}_q = \frac{\omega_r R_s \phi_f}{R_s^2 + \omega_r^2 L_d L_q}.$$

At high speed, the electromagnetic force can no longer be completely compensated, and therefore $$\frac{\gamma_{bat}}{\sqrt{3}} < \omega_r \phi_f,$$

consequently implying that Gd<perturbation$_d$, and $G_q$>perturbation$_q$, because $$\frac{L_d V_{bat}}{\sqrt{3}} > R_s \phi_f.$$

Activating the defluxing control mode in step 140 then provides, in step 150, voltage control of the motor based on the control parameter $\Theta$ varying within the range $$[-\frac{\pi}{2}; \frac{\pi}{2}].$$

By varying the control parameter $\Theta$ within this range, the quadrature current component $I_q$ is made to vary in the positive and negative domain, thus causing the synchronous machine to operate in motor mode and in generator mode, while still providing the maximum compensation for the term perturbatiorid, thus limiting the direct component $I_d$ which generates Joule losses. The synchronous machine is thus maintained with saturated voltages allowing a maximum electromagnetic torque to be obtained, while the currents are still controlled by means of the voltage control of the machine via the control parameter $\Theta$.

A check is made in step 160 to determine whether the direct current component $I_d$ has ceased to be negative. If it is still negative, the synchronous machine continues to be voltage controlled on the basis of the control parameter $\Theta$. When the control parameter $\Theta$ is used, in order to increase the quadrature current component $I_q$, the control parameter $\Theta$ must be increased to a maximum value of $\pi/2$ to achieve the maximum power attainable by the machine, the direct current component $I_d$ decreasing automatically with the increase in the control parameter $\Theta$. Conversely, in order to decrease the quadrature current component $I_q$, the control parameter $\Theta$ must be decreased to a minimum value of $-\pi/2$ to achieve the maximum regenerative torque. The invention thus provides auto-adaptation of the direct current component $I_d$.

Figure 2:
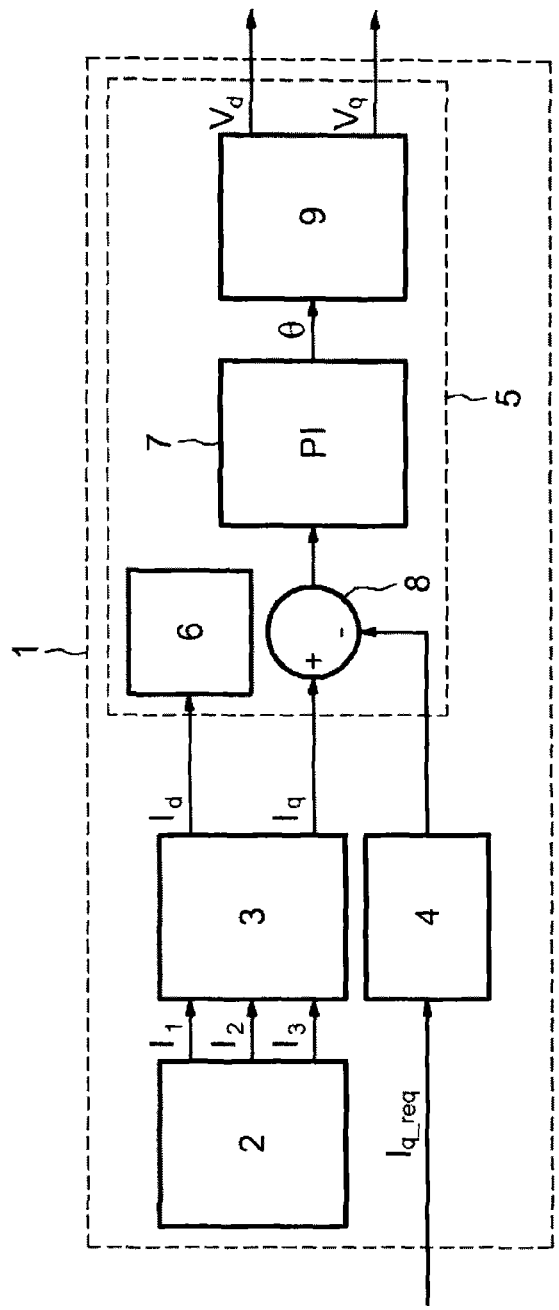
FIG. 2 shows in a schematic manner a system for controlling the electromagnetic torque of a synchronous machine according to one embodiment of the invention.

However, as soon as it ceases to be negative, the defluxing control mode is exited in step 170. FIG. 2 shows a system for controlling the electromagnetic torque of a three-phase synchronous machine with permanent magnets according to one embodiment of the invention.

The system 1 for controlling the electromagnetic torque of a three-phase synchronous machine with permanent magnets comprises means 2 for measuring the current delivered to the three phases $I_1$, $I_2$, $I_3$ of the machine. These measurement means 2 are coupled to transposition means 3 for transposing the three measured currents into a direct current component $I_d$ and a quadrature current component $I_q$ on the basis of the Park transform. The control system also comprises means 4 for receiving a setpoint $I_{q\_req}$ for the quadrature current component $I_q$.

The control system 1 comprises control means 5 including an activation module 6 receiving at its input the direct current component $I_d$ and adapted to activate a defluxing control mode in which the machine is controlled on the basis of a direct voltage component and a quadrature voltage component in the Park space of said machine, when the direct current component $I_d$ is negative.

The control means 5 comprise a proportional-integral controller 7 adapted to determine the same control parameter whose direct voltage component and quadrature voltage component depend on the difference between the setpoint $I_{q\_req}$ for the quadrature current component and the value of the quadrature current component $I_q$, calculated by the subtractor 8. The control means also comprise a module 9 adapted to determine the direct voltage component $V_d$ and quadrature voltage component $V_q$ on the basis of the control parameter $\Theta$.

The invention thus enables the electromagnetic torque of a synchronous machine with permanent magnets to be controlled while providing current stability in the synchronous machine when the latter is operating at high speed with saturated voltages.

The invention claimed is:

1. A method for controlling electromagnetic torque of a three-phase synchronous machine with permanent magnets, the method comprising:
   measuring current delivered to the three phases of the machine;
   transposing the three measured currents into a direct current component and a quadrature current component on the basis of a transform of the three-phase systems;
   receiving a setpoint for the quadrature current component; and
   when the direct current component is negative, activating a defluxing control mode in which the machine is controlled on the basis of a direct voltage component and a quadrature voltage component of the machine, the direct voltage component and the quadrature voltage component being determined in the plane related to the transform of the three-phase systems;
   wherein the direct component and the quadrature component of the control voltage of the synchronous machine depend on a same control parameter, determined to maintain a value of the direct current component near to zero and enabling a term due to magnetic flux of the permanent magnets to be compensated, and
   wherein the defluxing control mode is exited when the direct current component returns to a positive or zero value.

2. The method as claimed in claim 1, wherein the synchronous machine has perfect symmetry between the direct axis and the quadrature axis of the plane of the transform of the three-phase systems, enabling equality to be obtained between equivalent inductances on each axis of the plane of the transform of the three-phase systems.

3. The method as claimed in claim 1, wherein the direct component and the quadrature component of the control voltage are preferably proportional to a same maximum amplitude, and depend in a sinusoidal manner on the control parameter, the control parameter varying within a range $$[-\frac{\pi}{2}; \frac{\pi}{2}].$$

4. The method as claimed in claim 3, wherein the direct component and the quadrature component are expressed according to expression:

$$\begin{cases} V_d = -\frac{V_{bat}}{\sqrt{3}}\sin(\theta) \\ V_q = \frac{V_{bat}}{\sqrt{3}}\cos(\theta) \end{cases}$$

5. The method as claimed in claim 1, wherein the transform of the three-phase systems is a Park transform.

6. A system for controlling electromagnetic torque of a three-phase synchronous machine with permanent magnets, the system comprising:
   means for measuring current delivered to the three phases of the machine;
   means for transposing the three measured currents into a direct current component and a quadrature current component on the basis of a transform of the three-phase systems;
   means for receiving a setpoint for the quadrature current component; and
   control means for activating, when the direct current component is negative, a defluxing control mode in which the machine is controlled on the basis of a direct voltage component and a quadrature voltage component of the machine, the direct voltage component and the quadrature voltage component being determined in the plane related to the transform of the three-phase systems, wherein the control means comprises a proportional-integral controller configured to determine a same control parameter whose direct voltage component and quadrature voltage component depend on the difference between the setpoint for the quadrature current component and the value of the quadrature current component, and a module configured to determine the direct and quadrature voltage components on the basis of the control parameter.

7. The system as claimed in claim 6, wherein the control means comprises an activation module configured to activate the defluxing control mode when the direct current component is negative, and to disable the defluxing control mode when the direct current component is positive.

8. The system as claimed in claim 6, further comprising transposition means configured to apply a Park transform to the measured currents to obtain the direct current component and the quadrature current component.

9. A method for controlling electromagnetic torque of a three-phase synchronous machine with permanent magnets, the method comprising:

measuring current delivered to the three phases of the machine;

transposing the three measured currents into a direct current component and a quadrature current component on the basis of a transform of the three-phase systems;

receiving a setpoint for the quadrature current component; and when the direct current component is negative, activating a defluxing control mode in which the machine is controlled on the basis of a direct voltage component and a quadrature voltage component of the machine, the direct voltage component and the quadrature voltage component being determined in the plane related to the transform of the three-phase systems;

wherein the direct component and the quadrature component of the control voltage of the synchronous machine depend on a same control parameter, determined to maintain a value of the direct current component near to zero and enabling a term due to magnetic flux of the permanent magnets to be compensated, and wherein the synchronous machine has perfect symmetry between the direct axis and the quadrature axis of the plane of the transform of the three-phase systems, enabling equality to be obtained between equivalent inductances on each axis of the plane of the transform of the three-phase systems.

* * * * *